United States Patent [19]

Evans

[11] 4,349,914

[45] Sep. 14, 1982

[54] BIT SYNCHRONOUS SWITCHING SYSTEM FOR SPACE DIVERSITY OPERATION

[75] Inventor: Randall G. Evans, San Jose, Calif.

[73] Assignee: Ford Aerospace & Communications Corp., Detroit, Mich.

[21] Appl. No.: 136,584

[22] Filed: Apr. 1, 1980

[51] Int. Cl.³ .......................... H04B 7/08; H04L 1/06
[52] U.S. Cl. ...................................... 375/40; 371/68; 375/100; 455/135; 455/136
[58] Field of Search .................. 371/67, 68; 375/100, 375/40; 455/132, 133, 134, 135, 136, 137, 138, 139

[56] References Cited

U.S. PATENT DOCUMENTS

| | | | |
|---|---|---|---|
| 3,145,341 | 8/1964 | Andrew | 343/100 |
| 3,305,781 | 2/1967 | Robinson | 455/137 |
| 3,444,471 | 5/1969 | French | 455/139 |
| 3,555,427 | 1/1971 | Hatton | 375/100 |
| 3,795,687 | 8/1976 | Tan | 455/276 |
| 3,828,777 | 8/1974 | Muratani et al. | 455/8 |
| 4,015,205 | 3/1977 | Ikeda et al. | 455/133 |
| 4,030,040 | 6/1977 | Harbert | 455/135 |
| 4,052,670 | 10/1977 | Watanabe et al. | 455/52 |
| 4,079,318 | 3/1978 | Kinoshita | 455/139 |
| 4,097,804 | 6/1978 | Yamaguchi et al. | 455/73 |
| 4,164,709 | 8/1979 | Tudor et al. | 455/88 |
| 4,234,954 | 11/1980 | Lange et al. | 371/6 |

Primary Examiner—Benedict V. Safourek
Attorney, Agent, or Firm—Edward J. Radlo; Robert D. Sanborn

[57] ABSTRACT

A bit synchronous switching system is disclosed which has applicability in a space diversity system of digital telecommunications. Two versions of a signal waveform are received at two remote locations from the same signal source. The end user is able always to receive the more intelligible signal by means of instantaneous switching logic. An acquisition and tracking circuit, which can include a delay lock loop, keeps the two signal streams synchronized. One data stream is used as a reference and the time delay of the other is varied so that the time differential between the two streams is tracked out. The system features continuous tracking and does not require any frame synchronization to be superimposed on the data stream.

13 Claims, 3 Drawing Figures

BIT SYNCHRONOUS SWITCHING SYSTEM FOR SPACE DIVERSITY OPERATION

BACKGROUND OF THE INVENTION

1. Field of the Invention

This invention is a device and system which controls the synchronization and switching in a space diversity telecommunications system, where the same data is transmitted to two remote locations, to compensate for propagation vagaries due to weather, movement of the signal source (which may be a satellite), etc. Such a system has particular applicability at microwave frequencies (greater than 1 GHz).

2. Description of the Prior Art

A prior art search was conducted and disclosed the following U.S. patent references:

U.S. Pat. Nos. 3,829,777; 4,015,205; and 4,052,670 disclose space diversity switching systems. They differ from the present invention in that they all require that some type of frame synchronization be superimposed on the data stream. Thus, they do not provide the continuous bit tracking that the present invention is capable of, and they cannot be used with data, e.g., some categories of secure data, which prohibit frame synchronization. The present invention's continuous bit tracking and capability for use on data streams not having frame synchronization makes it much more suitable for asynchronous satellites and for secure data than these prior art systems.

Secondary references are U.S. Pat. Nos. 3,145,341; 3,555,427; 3,975,687; 4,030,040; 4,097,804; and 4,164,709.

SUMMARY OF THE INVENTION

The present invention provides real time synchronization and switching between two identical data streams in a space diversity system. A space diversity system is a telecommunications system in which identical data is transmitted over two different paths because of the foreknowledge that there will be intermittent and independent disruption of the telecommunications over the two paths because of atmospheric and propagation disruptions. Generally, a space-to-earth communications over 20 GHz in frequency requires a space diversity system in order to maintain integrity of data. A space diversity system comprises two terminals spaced apart from each other and from a remote signal source, such as a satellite or earth-based microwave repeater.

The present invention provides a means to keep the two data streams time synchronized, and a means to continuously select the "better" of the two streams, e.g., the stream having the lower binary error rate.

Even where the signal source is fixed in location, the two data streams arrive at the terminals with a component of time differential which varies because of atmospheric effects, as well as a fixed component of time differential that is a function of the difference in total path length of the two data streams as they travel from the signal source to the end user. The invention has particular applicability when the signal source is an asynchronous satellite, where, due to the grossly changing distance differential between the signal source and the two terminals, there is a wide variation in the time differential between the two bit streams.

FIG. 2 is an illustration showing a typical statistical distribution of J, the time differential between the two data streams.

The present invention maintains correlation between the two data streams by using one of them as a reference and varying the time delay of the other so that the time differential between the two streams is tracked out. An N-stage shift register clocked by a voltage controlled oscillator is used as a variable delay circuit with the amount of delay determined by the VCO frequency.

In the preferred embodiment, the correlation tracking is accomplished by a delay lock loop that generates an error voltage in response to a time offset between the two streams. A synthesized waveform contains all the information needed to control the VCO, and hence, the amount of delay needed through the N-stage shift register to maintain bit synchronism between the two streams. Once the two streams are in bit synchronism as determined by a correlation detector, switching logic selects the "better" bit stream (the one with the lower bit error rate, best signal-to-noise ratio, or other desirable characteristic) without any loss of data integrity.

Another type of correlation tracking that could be employed in this system is a tau-dither circuit.

BRIEF DESCRIPTION OF THE DRAWINGS

These and other more detailed and specific objects and features of the present invention are more fully disclosed in the following specification, reference being had to the accompanying drawings, in which.

DESCRIPTION OF THE PREFERRED EMBODIMENT

Figure 1:
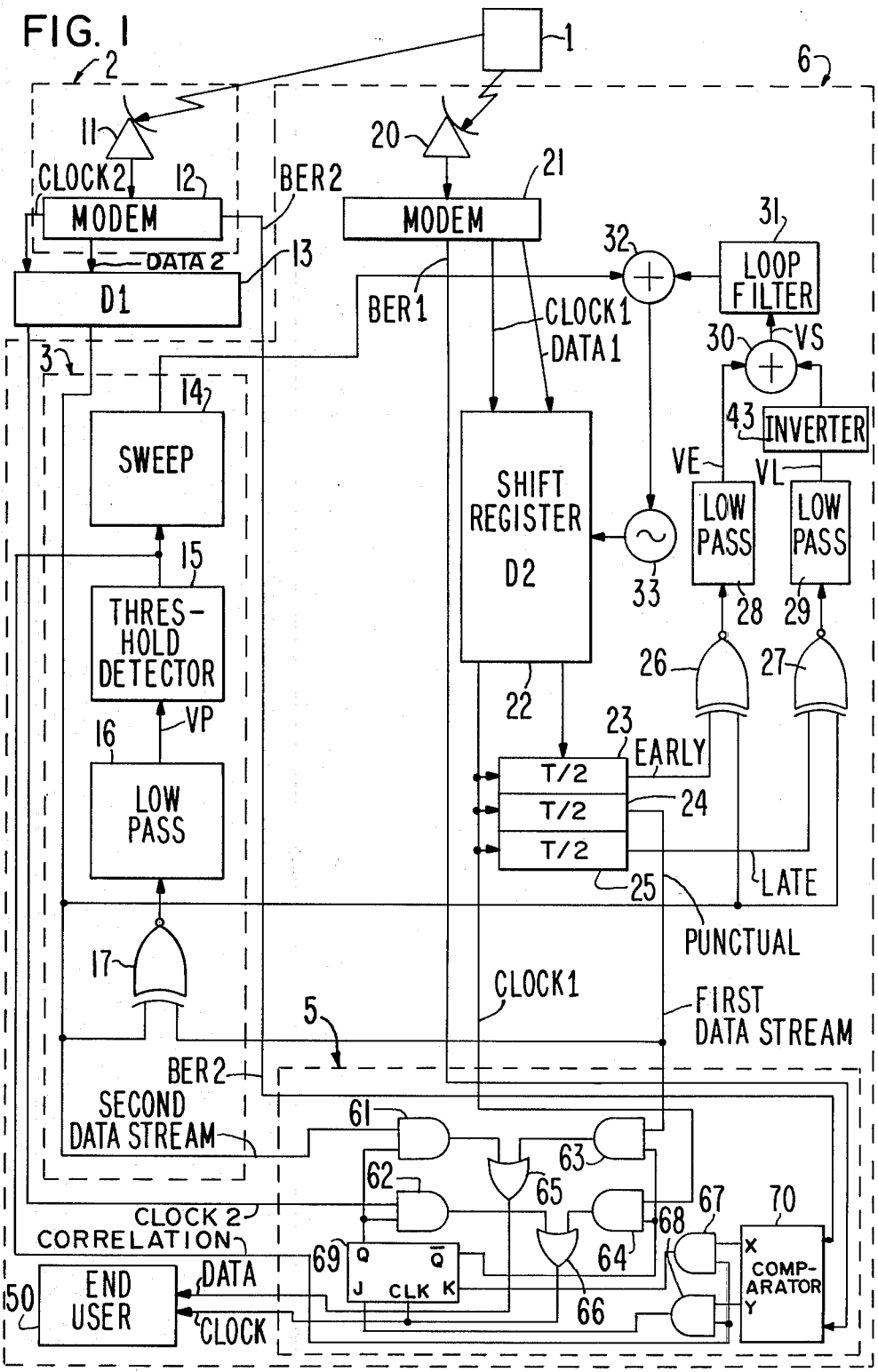
FIG. 1 is a part block, part schematic diagram showing the preferred mode of operation of the present invention.
Figure 2:
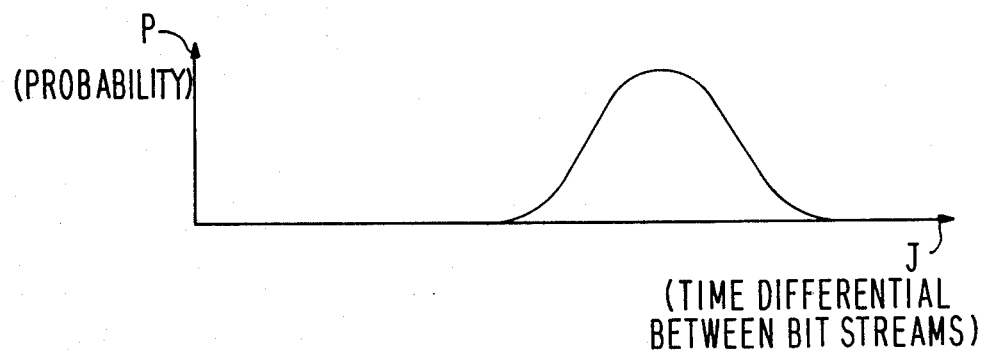
FIG. 2 is a curve showing the probability expectation of J, the time differential between the two data streams.

Signal source 1 is a source of digital information which is sent simultaneously to major terminal 6 and remote terminal 2 in the form of dual binary data streams. Terminals 2 and 6 are separated from each other by a distance which is typically a few hundred to a few thousand kilometers in the case where signal source 1 is a satellite and terminals 2 and 6 are situated on the earth. The satellite may be either synchronous or asynchronous.

Terminal 2 comprises antenna 11, which receives the signal from signal source 1, and modem 12 connected to antenna 11. Modem 12 produces a bit data stream along a data line, bit synchronization clock pulses along a clock line, and a binary error rate estimate or other measure of signal quality along a BER line. The data from modem 12 is connected to various parts of terminal 6 (exclusive-NOR gates 17, 26, and 27 and switching logic 5) after first passing through fixed delay means 13, which imparts a fixed time delay equal to D1. The purpose for fixed time delay means 13 is to insure that the data reaching major terminal 6 via antenna 11 (the "second" data stream) always arrives later than the signal reaching major terminal 6 via antenna 20 (the "first" data stream), regardless of the position of signal source 1 (which may be a moving source such as a satellite). There is usually no need to insert additional time delay in the case where the signal source is a synchronous satellite since there is always some time delay introduced because of the remoteness of terminal 2 from terminal 6. In this case the delay introduced by the transmission line between terminals 2 and 6 is sufficient, and D1 can be set equal to zero. A fiber optics delay line is a good choice for delay means 13 for high data rates and microwave frequencies because of its low cost and its ability to operate without clocking.

The signal received at terminal 6's antenna, antenna 20, is fed to modem 21. The demodulated data and the bit synchronization clock from modem 21 are fed to shift register 22, a dual N-stage shift register. After the data is delayed by shift register 22, it is fed into a succession of three delay means, 23, 24, and 25, each of which delays the signal by an amount of time equal to $T/2$ where T is the bit period of the data stream. Information as to the required amount of delay is fed to these three delay means by the clock signal, which has also been delayed by shift register 22 and is subsequently fed to switching logic 5. Similarly, the clock output from modem 12 is fed to switching logic 5 via delay means 13.

Delay means 23, 24, and 25 define, respectively, early, punctual, and late time slices through which the data from the first stream is processed. The output from delay means 23 is exclusive-NOR'ed with the D1-delayed data from the second data stream at gate 26. The output of delay means 25 is exclusive-NOR'ed with the D1-delayed data from the second data stream at gate 27. The output of delay means 24 is exclusive-NOR'ed with the D1-delayed data from the second data stream at gate 17, and is also fed, as the primary representative of the first data stream, to switching logic 5. Similarly, the D1-delayed data from the second data stream is fed to switching logic 5.

Exclusive-NOR gates 17, 26, and 27 work on the principle that the output to the gate is a "1" if the inputs are the same and the output is a "0" if the inputs are different. The output of gate 17 is passed through low pass filter 16 and becomes voltage VP. The output from gate 26 passes through low pass filter 28 and becomes voltage VE. The output of gate 27 passes through low pass filter 29 and becomes voltage VL. The function of low pass filters 16, 28, and 29 is to smooth the gate outputs to insure that VP, VE, and VL are DC voltages, not pulses. The frequency bandwidth of these three low pass filters is an order of magnitude greater than the bandwidth of loop filter 31 to avoid losing data.

Figure 3:
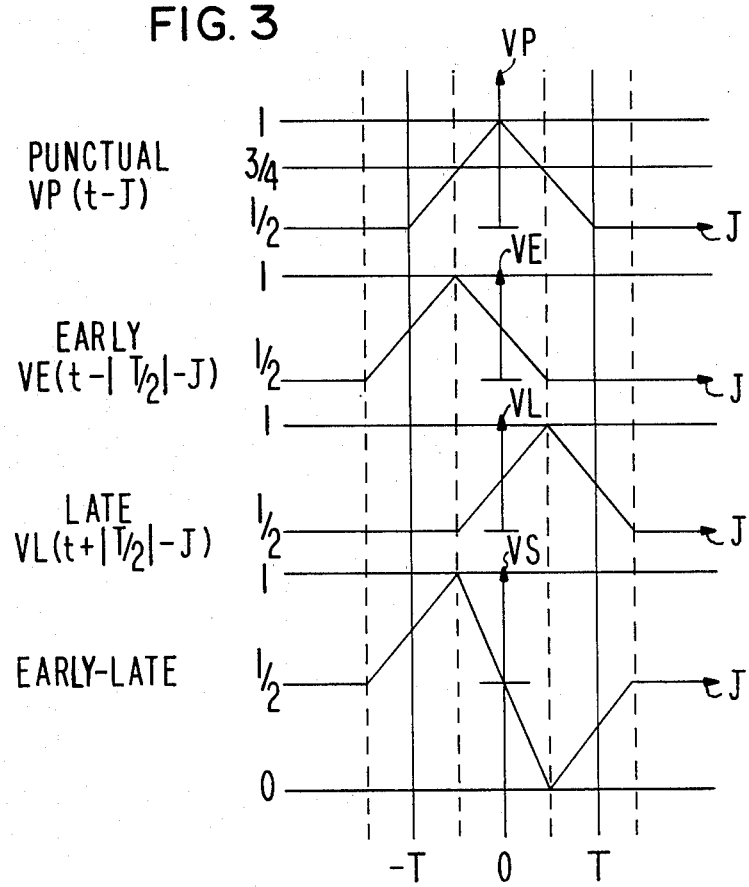
FIG. 3 is a set of time-superimposed waveforms showing voltages at various key points within the circuit of the present invention, as a function of J.

FIG. 3 is a set of time-superimposed waveforms illustrating the time-averaged voltages VP, VE, and VL that result when the two data streams are slid past each other in opposite directions, plus composite waveform VS. These waveforms are drawn with the independent variable being J, the time differential between the two bit streams.

With respect to the first waveform, that representing the punctual time slice, it is seen that when the bit streams are completely out of synchronization (greater than T apart) the average value of VP is $\frac{1}{2}$ because, over the sampling period incorporated into the waveform, half the time the compared bits from the two data streams are the same and half the time they are different. (These waveforms show relative voltages, i.e., $VP=1$ represents a binary 1 and $VP=0$ represents a binary 0). It is seen that at $J=0$ the two bit streams are in synchronization and $VP=1$. VP falls off in a triangular fashion so that it becomes $\frac{1}{2}$ at all points farther than T away from the origin $J=0$.

The waveform representing the early time slice, VE as a function of J, is the same as for VP except its peak occurs at $J=-T/2$. The waveform representing the late time slice, VL as a function of J, is the same as for VP except that the peak occurs at $J=T/2$. Summing means 30 (which is, e.g., a power coupler) sums VE and the inverse of VL (which has been inverted by inverter 43), giving a resultant voltage $VS=VE-VL$, depicted as the fourth waveform of FIG. 3.

VS is filtered by loop filter 31, an integrator that typically averages the signal over at least 100 bits. The function of loop filter 31 is to determine the loop parameters such as loop gain, damping factor, and bandwidth of the elements comprising the delay lock loop (i.e., delay means 23, 24, and 25, gates 26 and 27, filters 28, 29, and 31, inverter 43 and summing means 30). The design of loop filter 31 involves a major tradeoff: it is desirable to increase the bandwidth so as to decrease the acquisition time needed for synchronization (correlation) of the two data streams; on the other hand, it is desirable to decrease the bandwidth so as to provide greater noise immunity and to decrease the probability of occurrence of false correlation peaks.

The signal filtered by filter 31 is summed by summing means 32 (e.g., a power coupler) with the signal from acquisition sweep 14 and is then fed to voltage controlled oscillator 33, used to adjust the amount of delay within shift register 22 as a function of the voltage applied to VCO 33. The frequency of VCO 33 should be at least three times the frequency of the CLOCK 1 input to shift register 22 to insure adequate sampling, and should preferably be higher to minimize data jitter and clock jitter.

The acquisition of synchronization of the two data streams is performed by acquisition means 3 as follows: VP is fed to threshold detector 15, where a comparison and decision is made: If VP is greater than V-lock, the preselected locking voltage, acquisition has been achieved and (1) acquisition sweep 14 is turned off and (2) a signal is sent via a correlation line to switching logic 5 to inform said logic that acquisition has been achieved and it is now possible for said logic to determine which of the two bit streams is superior and perform any necessary switching. A tradeoff is made when one selects V-lock. The higher V-lock, the greater the noise immunity, but the slower the acquisition sweep must be. Typically, V-lock is greater than or equal to $3VP/4$. The threshold detector can comprise a voltage comparator such as an operational amplifier.

Acquisition sweep 14 is typically a triangular waveform oscillator which sweeps across a voltage range sufficient to enable VCO 33 to sweep across the desired range of delay for shift register 22. The voltage sweep is performed in a linear fashion. When VP exceeds V-lock, the acquisition sweep is turned off; at this point, loop filter 31 controls VCO 33 by itself via its negative feedback system, as can be seen by examining the fourth waveform of FIG. 3, VS as a function of J. It can be seen from this waveform that after the acquisition has been accomplished (VP greater than or equal to $\frac{3}{4}$), the bit streams are within the range of $J=-T/2$ to $J=T/2$. Thus, for example, if J starts to increase, then VS decreases. This causes a smaller amount of delay to be fed to shift register 22 which in turn causes J to decrease back towards zero. Similarly, if J starts to become negative, VS becomes positive which feeds a greater amount of delay to shift register 22 which causes J to increase back towards zero. Thus, the system is locked in by means of this negative feedback delay lock loop tracking system.

The data signals fed to switching logic 5 from each of the two data streams are in synchronization because at that point D1=D2+T where D1 is the delay imparted by delay means 13, D2 is the delay imparted by shift register 22, and T is the additional delay imparted to the punctual representation of the first data stream fed to switching logic 5. Once switching logic 5 has selected the superior data stream, it switches both the clock and the data lines from this stream to end user 50 via separate data and clock lines.

The operation of switching logic 5 is as follows: The first data stream is fed as one input to AND gate 63. The second data stream is fed as one input to AND gate 61. The outputs of AND gates 61 and 63 are OR'ed via OR gate 65 and then fed as the data input to end user 50. The clock 1 line is fed as one input to AND gate 64. The clock 2 line is fed as one input to AND gate 62. The outputs of AND gates 62 and 64 are OR'ed together via OR gate 66 and fed as the clock input line to end user 50.

The bit error rate lines from each of modems 12 and 21 are fed to comparator 70. Data on these lines could be several digital bits which may be fed in parallel to a parallel comparator 70, or they could be analog information compared by analog comparator 70. In any event, comparator 70 has two outputs, X and Y, which represent mutually exclusive and exhaustive results of the comparison of the quality of signals reaching modems 12 and 21. For example, the X output can be a 1 when quality of data from the second data stream is better than that of the first data stream; in this case, Y will be a 0. Similarly, Y is a 1 when the data on the first stream is better than or equal to that on the second stream; in this case, X is a 0.

The signal from the X output of comparator 70 is fed as one input to AND gate 67. The signal from the Y output of comparator 70 is fed as one input to AND gate 68. The output of AND gate 67 is fed to the K input terminal of JK flip-flop 69. The output from AND gate 68 is fed to the J input terminal of flip-flop 69. The signal on the correlation line (output of threshold detector 15) is fed as an input to each of AND gates 67 and 68. This signal is a 1 once correlation has been achieved, and a 0 when the system is not in correlation. Thus, if the system is not in correlation, a 1 cannot be outputted by either of AND gates 67 or 68, a flip-flop 69 will not change state.

The Q output of flip-flop 69 is fed as an input to each of AND gates 61 and 62. The $\overline{Q}$ output of flip-flop 69 is fed as an input to each of AND gates 63 and 64. The clock terminal of flip-flop 69 is connected to the clock line after it leaves OR gate 66.

Thus it is seen that flip-flop 69 serves as a switch to couple end user 50 to the better of the two data streams and to the clock line associated with that stream. The fact that the clock input of flip-flop 69 is connected to the clock line means that the flip-flop transitions only on a leading bit edge, i.e., the data streams are switched only at the beginning of a bit.

For the conditions given above, when X=1 the quality of the second data stream is better than the quality of the first data stream. Assuming that the correlation line is a 1, the output of AND gate 67 will also be a 1, while the output of gate 68 will be 0. K will receive a 1, in which case Q is 1 and $\overline{Q}$ is 0. In this case, the data and the clock information from the second data stream are fed to end user 50 through AND gates 61 and 62, since these gates are enabled by the positive signal emanating from the Q output of flip-flop 69.

If the first data stream becomes totally unusable and the second data stream remains good, then the switching logic 5 routes the second data stream to end user 50. The sweep circuit 14 is activated by threshold detector 15 and VCO 33 is swept in frequency to sweep the delay of shift register 22 until the first data stream becomes good again and correlation occurs between the first data stream and the second data stream. At this point operation proceeds as previously described.

If the second data stream becomes totally unusable and the first data stream remains good, then the switching logic 5 routes the first data stream to end user 50. The sweep circuit 14 is activated by threshold detector 15 and VCO 33 is swept in frequency to sweep the delay of shift register 22. However, depending upon the requirements of end user 50, it may be necessary to restrict the VCO 33 sweep frequency range and sweep rate to prevent adverse phase modulation effects on the first data stream and its associated CLOCK 1.

The above description is included to illustrate the operation of the preferred embodiment, and is not meant to limit the scope of the invention. The scope of the invention is to be limited only by the following claims. From the above discussion, many variations will be apparent to one skilled in the art that would yet be encompassed by the spirit and scope of the invention.

What is claimed is:

1. A space diversity synchronization circuit comprising:
a source of electromagnetic signals modulated with binary information but not containing frame synchronization information;
first and second receivers spaced remotely from each other and from said signal source for receiving transmissions from said signal source;
said receivers each containing a demodulator having an input responsive to said source of radio signals and a first output comprising a baseband signal containing said binary information;
coupled to each of said baseband signals, means for correlating said two baseband signals to each other with respect to time;
wherein said correlating means comprises acquisition means connected to one of said baseband signals, said acquisition means being active prior to correlation and inactive subsequent to correlation.

2. The apparatus of claim 1 further comprising:
means located within each of said demodulators for monitoring the quality of binary data demodulated by said demodulator;
means coupled to each of said monitoring means for continuously comparing the relative quality of said two baseband signals; and
means coupled to said comparing means for instantaneously switching end user trunk lines to that baseband signal exhibiting the better quality.

3. The apparatus of claim 2 wherein each of said monitoring means comprises a binary error rate estimator.

4. The apparatus of claim 1 wherein said acquisition means comprises a linear sweep oscillator and said correlating means further comprises a delay lock loop connected to the sweep oscillator.

5. The apparatus of claim 4 wherein said acquisition means further comprises an acquisition threshold detector connected to said linear sweep oscillator; and said correlating means further comprises variable delay means coupled to said delay lock loop and to said sweep oscillator via a summer.

6. The apparatus of claim 5 wherein said delay lock loop gates said baseband signal that is connected to said acquisition means into three time periods, and changes the amount of said variable delay based upon a comparison of said two baseband signals within two of said time periods.

7. A method for maximizing the intelligibility of microwave binary-encoded data transmitted from a remote source, said microwave data not containing frame synchronization information, comprising:
establishing first and second data reception terminals, each having an antenna responsive to said data and a demodulator connected to said antenna for demodulating said data into a baseband signal;
locating an end user station in relative proximity to said first terminal;
providing means within said first terminal for determining when the two baseband signals are in time synchronization with respect to each other based upon a preselected synchronization criterion; and
employing a feedback mechanism to keep said signals in synchronization.

8. The method of claim 7 further comprising the steps of:
continuously monitoring the quality of the baseband signals;
continuously comparing the quality of the two baseband signals; and
continuously switching to the end user station that baseband signal having the better quality.

9. Apparatus comprising the elements of:
a source of binary-encoded electromagnetic radiation;
first and second receivers spaced remotely from each other and from said source for receiving the radiation, each receiver comprising a demodulator which produces a baseband signal containing said binary information;
means for establishing correlation between the baseband signals comprising a variable delay element coupled to one of said baseband signals and activated by a variable voltage element, means coupled to said variable voltage element for monotonically varying the voltage thereon, and means coupled to said voltage varying means for deciding when correlation has been achieved based upon a preselected correlation criterion.

10. The apparatus of claim 9 wherein said deciding means comprises a logical gate and a comparator.

11. The apparatus of claim 9 wherein said establishing means further comprises the additional element of a negative feedback loop for insuring the continuation of correlation, said feedback loop coupled to said variable voltage element and to said voltage varying means.

12. The apparatus of claim 11 wherein said loop comprises at least two fixed delay elements, two logic gates coupled to said fixed delay elements, respectively, and an integrator coupled to each of said logic gates, to said variable voltage element, and to said voltage varying means.

13. The apparatus of claim 9 further comprising the additional elements of:
means within each of said demodulators for measuring the quality of each of the two baseband signals;
means coupled to each of said measuring means for comparing the quality of the two baseband signals;
means coupled to said comparing means for selecting the baseband signal exhibiting the better quality; and
means coupled to said selecting means for receiving the better baseband signal.

* * * * *